(12) United States Patent
Keny et al.

(10) Patent No.: US 9,194,257 B2
(45) Date of Patent: Nov. 24, 2015

(54) TURBINE CONDUIT SLEEVE SYSTEM

(75) Inventors: Mayur Abhay Keny, Bangalore (IN); Josef Scott Cummins, Simpsonville, SC (US); Scott Jacob Huth, Greenville, SC (US); Thangaraj Subbareddyar, Tamil Nadu (IN)

(73) Assignee: General Electric Company, Schenectady, NY (US)

( * ) Notice: Subject to any disclaimer, the term of this patent is extended or adjusted under 35 U.S.C. 154(b) by 642 days.

(21) Appl. No.: 13/569,648

(22) Filed: Aug. 8, 2012

(65) Prior Publication Data

US 2014/0044533 A1    Feb. 13, 2014

(51) Int. Cl.
*F01D 25/24* (2006.01)

(52) U.S. Cl.
CPC ............... *F01D 25/243* (2013.01); *Y02E 20/16* (2013.01)

(58) Field of Classification Search
CPC ....... F01D 25/14; F01D 25/26; F01D 25/305; F01D 25/08; F01D 25/12; F01D 9/06; F01D 9/065; F01D 5/08; F01D 5/081; F01D 5/082; F01D 5/084; F01D 5/085; F01D 5/087; F01D 5/088; F01D 25/243
See application file for complete search history.

(56) References Cited

U.S. PATENT DOCUMENTS

| 4,772,178 | A | | 9/1988 | Miller | |
|---|---|---|---|---|---|
| 5,984,637 | A | * | 11/1999 | Matsuo | ........................ 416/97 R |
| 7,390,167 | B1 | * | 6/2008 | Bouiller et al. | ............. 416/96 R |
| 2009/0324397 | A1 | | 12/2009 | Caruso et al. | |

* cited by examiner

*Primary Examiner* — Craig Kim
*Assistant Examiner* — Adam W Brown
(74) *Attorney, Agent, or Firm* — Ernest G. Cusick; Hoffman Warnick LLC (57) ABSTRACT

Systems and devices configured to shield portions of turbine conduits from contact with a working fluid flow and reduce the associated thermal gradients therein are disclosed. In one embodiment, a sleeve includes: a base portion defining a shield aperture, the base portion including an external surface configured to contact an internal surface of a turbine conduit; and a neck portion connected to the base portion and defining a neck aperture proximate a terminus of the turbine conduit, the neck aperture fluidly connected to the shield aperture.

20 Claims, 12 Drawing Sheets

TURBINE CONDUIT SLEEVE SYSTEM

BACKGROUND OF THE INVENTION

The subject matter disclosed herein relates to turbines and, more particularly, to systems and devices for shielding conduit surfaces in a turbine and reducing thermal gradients within turbine components.

Some power plant systems, for example certain nuclear, simple cycle and combined cycle power plant systems, employ turbines in their design and operation. Some of these turbines (e.g., gas turbines) include conduits (e.g., routing holes, cooling holes, etc.) which route fluids about and within components of the turbine. During operation, as these conduits redirect portions of the working fluid, the materials and components which comprise these conduits may become thermally stressed and/or exposed to turbulent fluid conditions (e.g., during start-up, cool-down, or shut down). As the working fluid flow contacts these components, thermal gradients may develop across component regions, causing differential expansion, cracking, and wear. For example, the heat transfer coefficient at an exposed edge of a conduit may vary significantly relative to the heat transfer coefficient at an internal portion of the conduit. This variance in the heat transfer coefficient may develop thermal gradients which impart thermal stresses, damage components, decrease efficiency, shorten component lifespan, and limit turbine design options.

Figure 1:
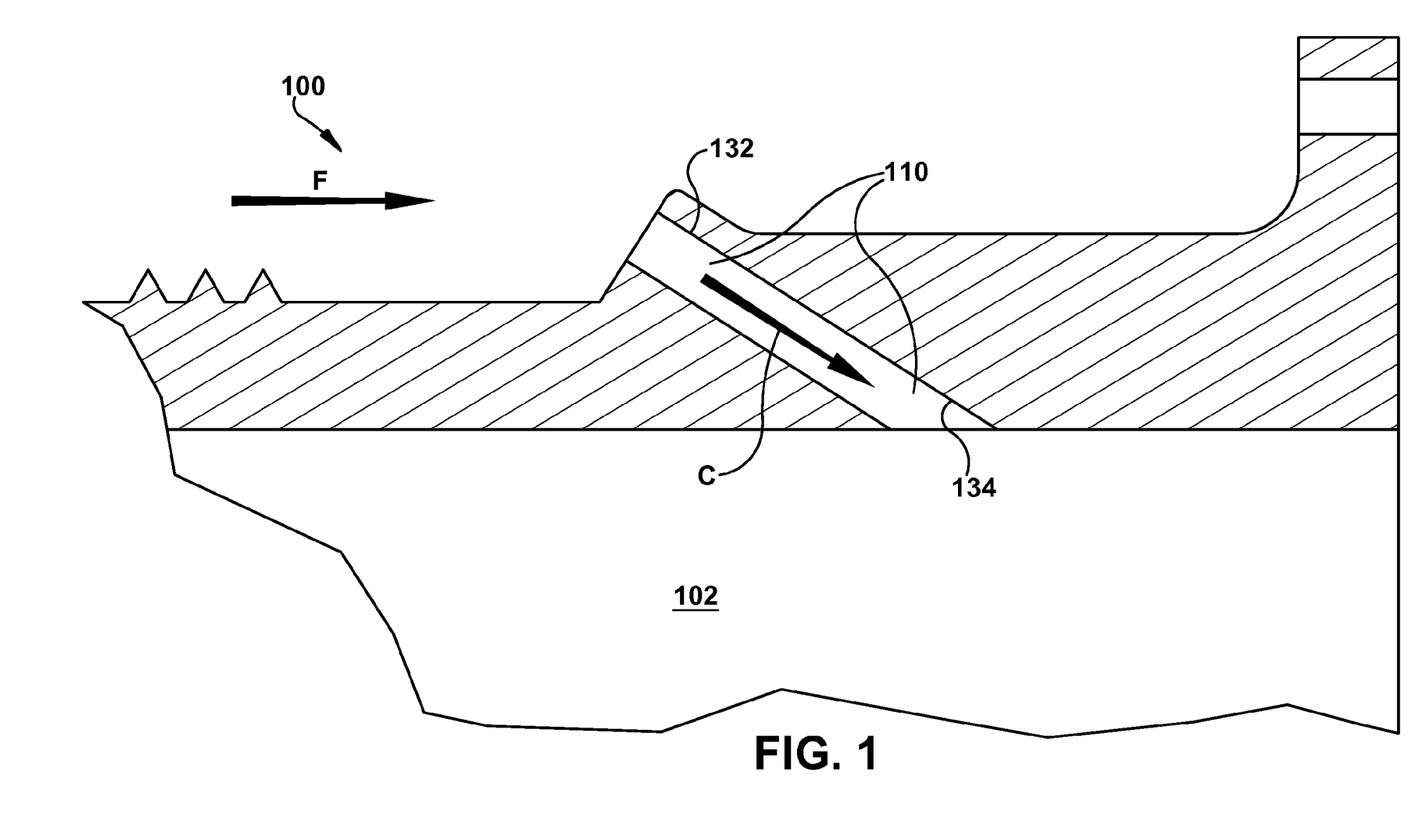
FIG. 1 shows a partial cut-away schematic view of a portion of a turbine.

Referring to FIG. 1, a schematic partial cross sectional view of a portion of a turbine 100 is shown including a turbine component 102. Turbine 100 illustrated in FIG. 1 may include a component conduit 110 formed in turbine component 102. During operation a working fluid flow 'F' may contact turbine component 102 and/or component conduit 110. Component conduit 110 may direct a cooling portion 'C' of working fluid flow F into turbine component 102 and about turbine 100. A first surface 132 of component conduit 110 proximate working fluid flow F may be exposed to a high degree of turbulence and thermal variation relative a second surface 134 of component conduit 110 disposed within turbine component 102. This variance in turbulence and thermal exposure may cause thermal stresses, component damage and inefficient operation.

BRIEF DESCRIPTION OF THE INVENTION

Systems and devices adapted to shield portions of turbine conduits from contact with a working fluid flow and reduce the associated thermal gradients therein are disclosed. In one embodiment, a sleeve includes: a base portion defining a shield aperture, the base portion including an external surface configured to contact an internal surface of a turbine conduit; and a neck portion connected to the base portion and defining a neck aperture proximate a terminus of the turbine conduit, the neck aperture fluidly connected to the shield aperture.

A first aspect of the disclosure provides a sleeve including: a base portion defining a shield aperture, the base portion including an external surface configured to contact an internal surface of a turbine conduit; and a neck portion connected to the base portion and defining a neck aperture proximate a terminus of the turbine conduit, the neck aperture fluidly connected to the shield aperture.

A second aspect provides a turbine including: a stator; a working fluid passage substantially surrounded by the stator; a rotor configured radially inboard of the working fluid passage; a turbine component connected to the rotor, the turbine component including a turbine conduit; and a sleeve disposed within a portion of the turbine conduit, the sleeve including: a base portion defining a shield aperture, the base portion including an external surface configured to contact an internal surface of the turbine conduit; and a neck portion connected to the base portion and defining a neck aperture proximate a terminus of the turbine conduit, the neck aperture fluidly connected to the shield aperture.

A third aspect provides a system including: a turbine component configured to connect to a rotor, the turbine component including a turbine conduit; and a sleeve disposed within a portion of the turbine conduit, the sleeve including: a base portion defining a shield aperture, the base portion including an external surface configured to contact an internal surface of the turbine conduit; and a neck portion connected to the base portion and defining a neck aperture proximate a terminus of the turbine conduit, the neck aperture fluidly connected to the shield aperture.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the disclosure are not necessarily to scale. The drawings are intended to depict only typical aspects of the disclosure, and therefore should not be considered as limiting the scope of the disclosure. It is understood that elements similarly numbered between the FIGURES may be substantially similar as described with reference to one another. Further, in embodiments shown and described with reference to FIGS. 1-12, like numbering may represent like elements. Redundant explanation of these elements has been omitted for clarity. Finally, it is understood that the components of FIGS. 1-12 and their accompanying descriptions may be applied to any embodiment described herein.

DETAILED DESCRIPTION OF THE INVENTION

As indicated herein, aspects of the invention provide for systems and devices configured to shield portions of turbine conduits from contact with a working fluid flow and reduce the associated thermal gradients therein. The sleeves of these systems are installed in a first portion of the conduit, shielding the first portion from directly contacting the working fluid flow and directing a portion of the flow into the conduit. These sleeves may adjust a flow quality (e.g., from laminar to turbulent) of the working fluid as it enters and travels through the conduit, thereby effecting the heat transfer coefficient of the conduit and forming a more uniform heat transfer coefficient throughout the conduit. In some embodiments, the conduit may include internal portions which are textured (e.g., grooved, patterned, etc.); these textured portions may be configured to adjust flow quality (e.g., transition from laminar to turbulent boundary flow) through the conduit. In one embodiment, the conduit may include a set of slots on an internal surface which may impact and/or modify flow transition from laminar to turbulent boundary flow.

Turning to the FIGURES, embodiments of systems and devices including sleeves are shown, where the sleeves may impact turbine performance and increase the life expectancy of the turbine components, the turbine and the overall power generation system by reducing thermal gradients. Each of the components in the FIGURES may be connected via conventional means, e.g., via a common conduit or other known means as is indicated in FIGS. 2-12. Specifically, referring to FIG. 2, a partial cut-away schematic view of a portion of turbine 100 including turbine component 102 (e.g., a turbine wheel, a rotor, etc.) exposed to working fluid flow F is shown according to embodiments of the invention. In this embodiment, a sleeve 120 is located in a first section 112 of component conduit 110, shielding first section 112 and first surface 132 (shown in FIG. 1) from exposure to working fluid flow F and/or cooling flow C. Sleeve 120 may include/define a sleeve conduit 550 (shown in phantom) configured to enable fluid to pass through sleeve 120 (e.g., from working fluid flow F to within component conduit 110) via a shield aperture 324 (shown in FIG. 3) and a neck aperture 322 (shown in FIG. 3). Sleeve 120 may include a base portion 124 within first section 112, and a neck portion 122 connected to base portion 124 and extending away from turbine component 102 and into working fluid flow F. Base portion 124 may define a portion of sleeve conduit 550 and shield aperture 324, and may include an external surface 133 in contact with first surface 132 of first section 112 of component conduit 110. Neck portion 122 may define neck aperture 322 which is fluidly connected to shield aperture 324 by sleeve conduit 550 which passes through sleeve 120. Extension of neck portion 122 into flow F may obtain cooling flow C therefrom and adjust a flow characteristic (e.g., from laminar to turbulent flow) of the cooling flow C within component conduit 110 and/or sleeve conduit 550.

Figure 2:
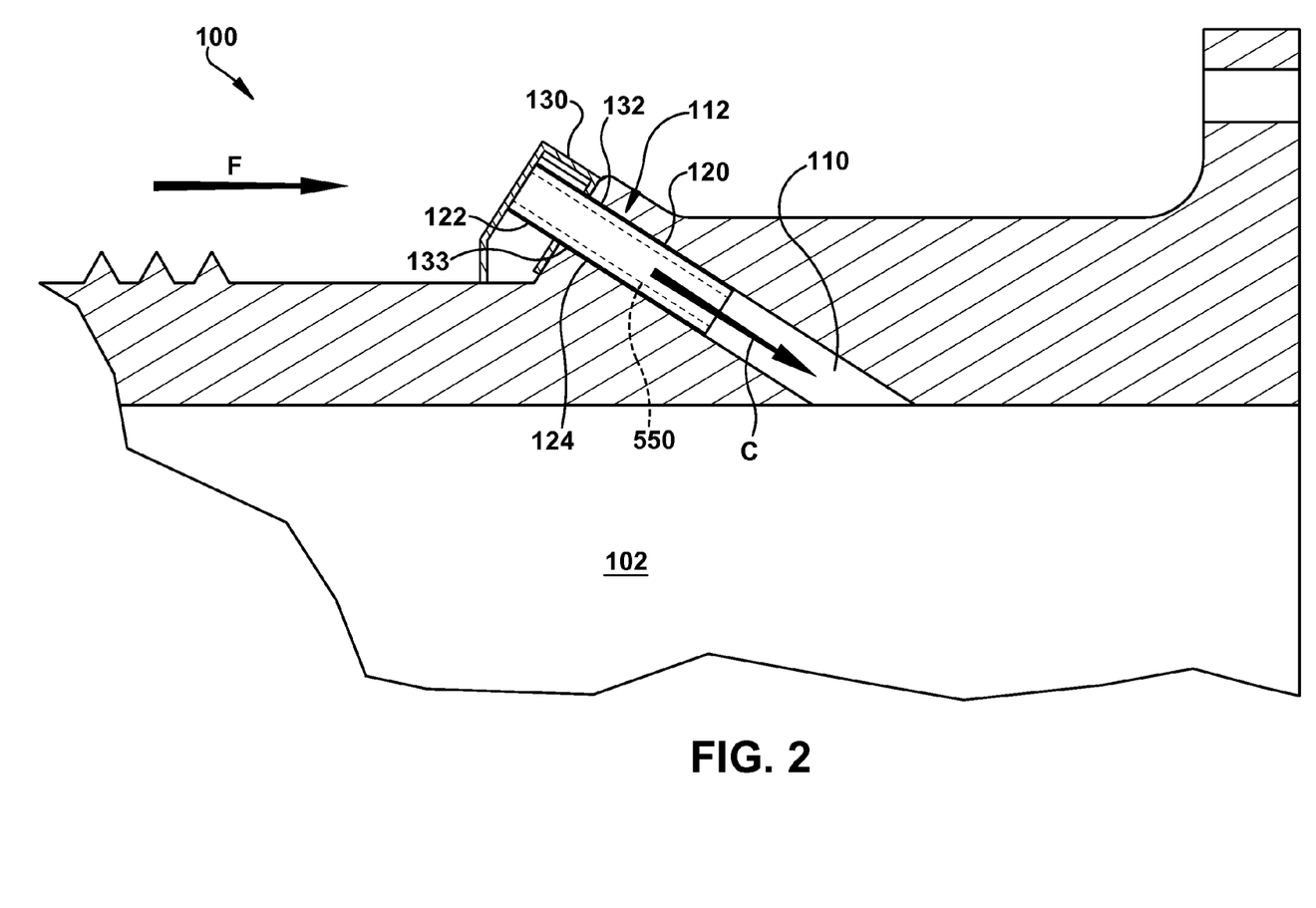
FIG. 2 shows a partial cut-away schematic view of a portion of a turbine according to an embodiment of the invention.

In an embodiment, a cover 130 may connect to neck portion 122 and be configured to direct flow into sleeve conduit 550 and/or component conduit 110. In one embodiment, cover 130 may further direct flow about neck portion 122 and turbine 100 so as to reduce windage effects. Sleeve 120 and/or cover 130 may include steel, aluminum, carbon fiber, ceramic, or any other materials as are known or later developed. Sleeve 120 may be positioned at any angle relative to turbine 100. Sleeve 120 may shield a portion of component conduit 110 or an entirety of component conduit 110.

Figure 3:
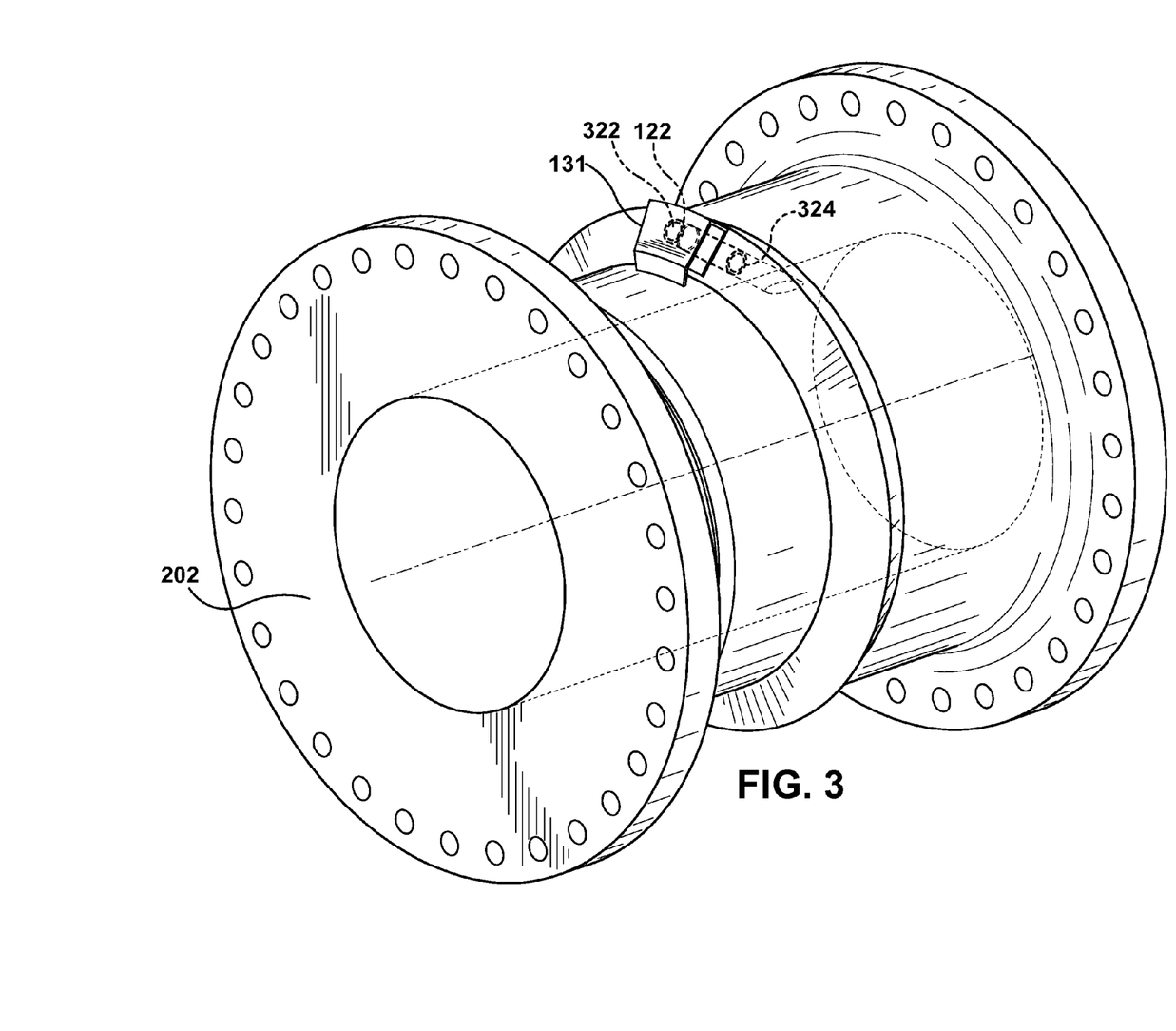
FIG. 3 shows a three-dimensional perspective view of a portion of a turbine according to an embodiment of the invention.

Turning to FIG. 3, a three-dimensional perspective view of a portion of turbine 100 including a cover 131 connected to a turbine wheel 202 is shown according to embodiments of the invention. In this embodiment, cover 131 has a 'c' shape which forms two axial surfaces external to component conduit 110. Cover 131 may be connected to neck portion 122 so as to support and/or orient sleeve 120 relative turbine 100 and flow F. Cooling flow C may enter sleeve 120 via neck aperture 322, passing through sleeve conduit 550 (shown in FIG. 2) and entering component conduit 110 via shield aperture 324.

Figure 4:
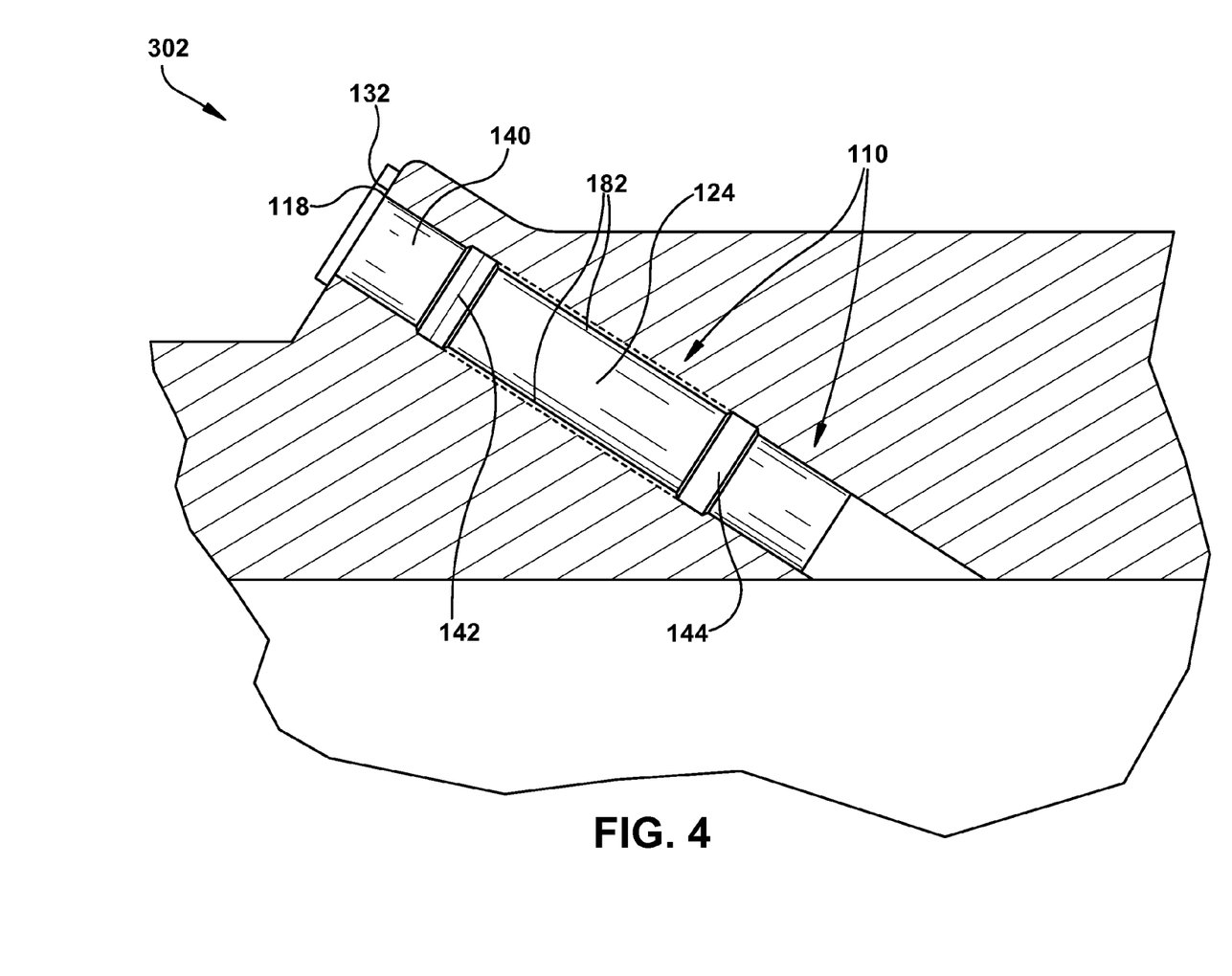
FIG. 4 shows a partial cut-away schematic view of a portion of a turbine according to an embodiment of the invention.

Turning to FIG. 4, a partial cut-away schematic view of a portion of a turbine 302 is shown with a sleeve 140 disposed within component conduit 110 according to embodiments. In this embodiment, sleeve 140 may include a first stand-off ring 142 and a second stand-off ring 144 both in contact with turbine 302. In one embodiment, either or both of first stand-off ring 142 and second stand-off ring 144 may include a 360 degree ridge about sleeve 140 in contact with turbine 302. In another embodiment, a set of partial ridges and/or dimples may substantially comprise either or both of first stand-off ring 142 and second stand-off ring 144. In one embodiment, second stand-off ring 144 may form a seal between sleeve 140 and component conduit 110, substantially fluidly isolating a cavity 182 (shown in phantom) between sleeve 140 and component conduit 110 (e.g., turbine 302). Second stand-off ring 144 may prevent fluid flow into and within cavity 182 between component conduit 110 and sleeve 140. In one embodiment, either or both of first stand-off ring 142 and second stand-off ring 144 may include a seal (e.g., a "C" seal) configured to fluidly isolate portions of component conduit 110. Stand-off rings 142 and 144 may reduce conduction of thermal energy into turbine 302 by limiting surface area contact (e.g., direct physical contact) between sleeve 140 and component conduit 110. Sleeve 140 may further include a seal ring 132 connected to turbine component 102 at a terminus 118 of component conduit 110. Seal ring 132 may be adapted to contact turbine 302 and extend radially outward from a center of component conduit 110 and sleeve 140 such that seal ring 132 covers and/or seals an interface between sleeve 140 and component conduit 110.

Figure 5:
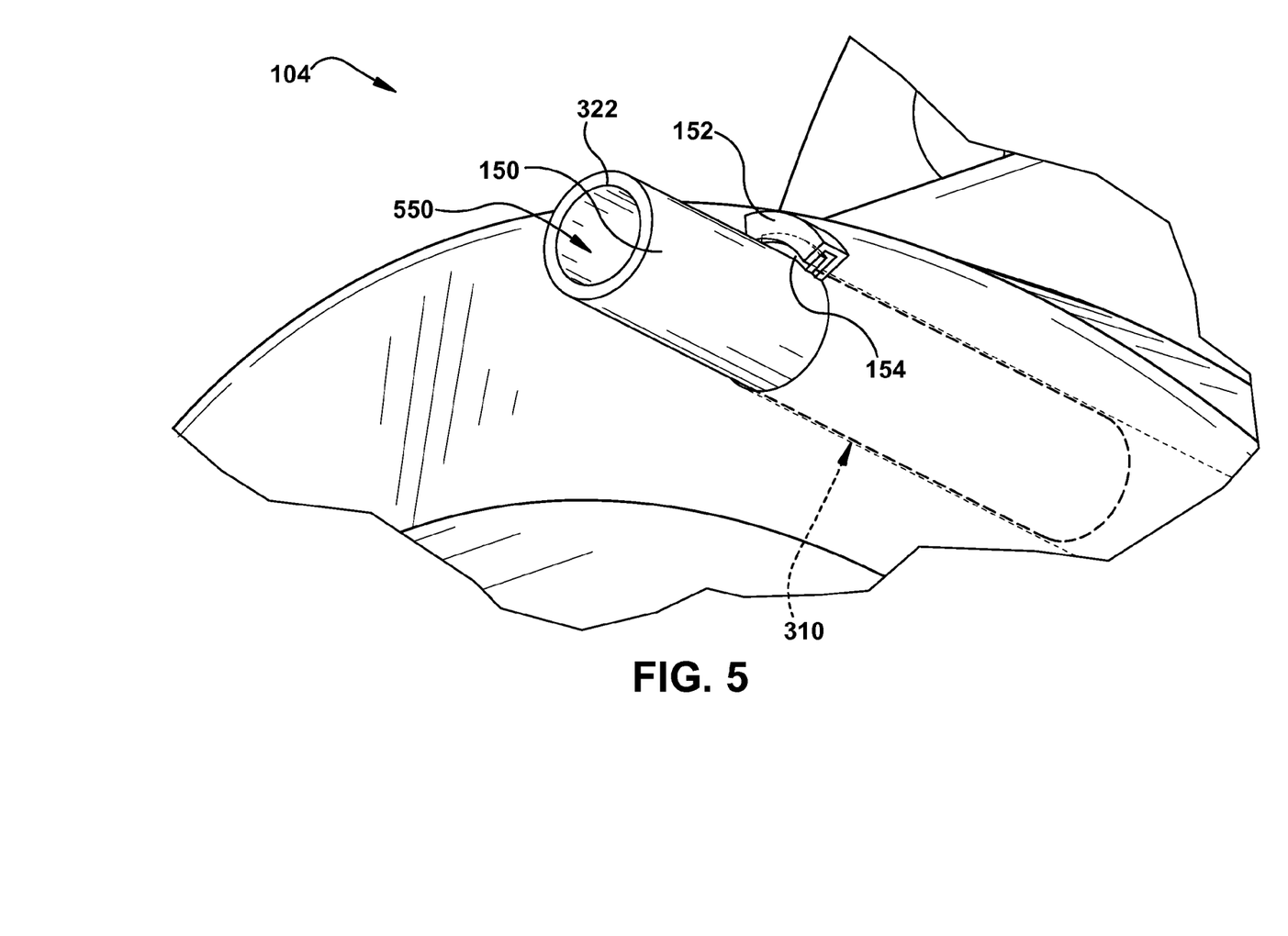
FIG. 5 shows a three-dimensional perspective view of a portion of a turbine according to an embodiment of the invention.
Figure 6:
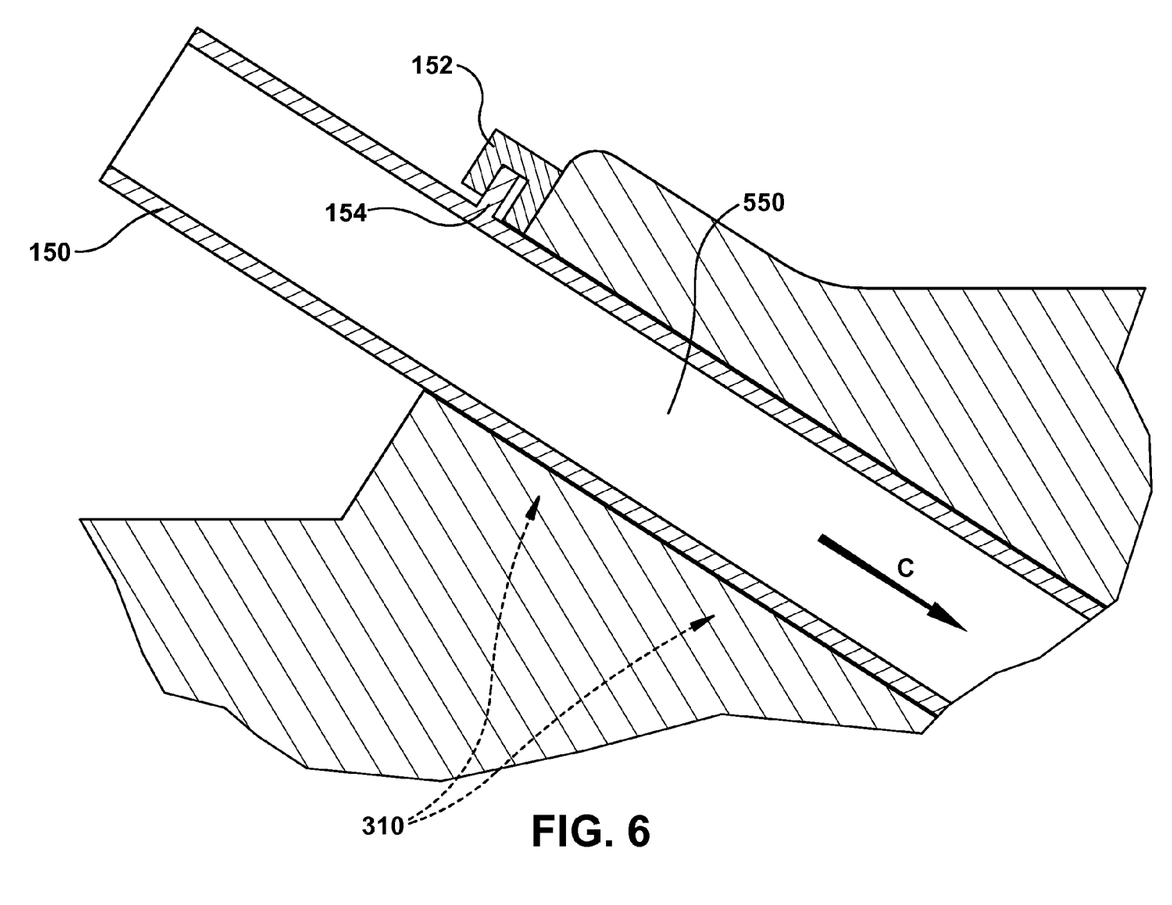
FIG. 6 shows a partial cut-away schematic view of a portion of a turbine according to an embodiment of the invention.

Turning to FIG. 5, a three-dimensional perspective view of a portion of a turbine component 104 is shown including a sleeve 150 disposed within a component conduit 310 (shown in phantom) according to embodiments of the invention. In this embodiment, sleeve 150 defines sleeve conduit 550 and includes a flange 154 configured to connect with a slot 152 on turbine component 104 and thereby connect sleeve 150 to turbine component 104. As can be seen in FIG. 6, sleeve 150 may be inserted in component conduit 310 and then rotated to mate flange 154 with slot 152, thereby axially and radially restraining sleeve 150 from movement. It is understood that flange 154 may be retained in slot 152 using any now known or later developed techniques (e.g., an interference fit, a clasp, etc.).

Figure 7:
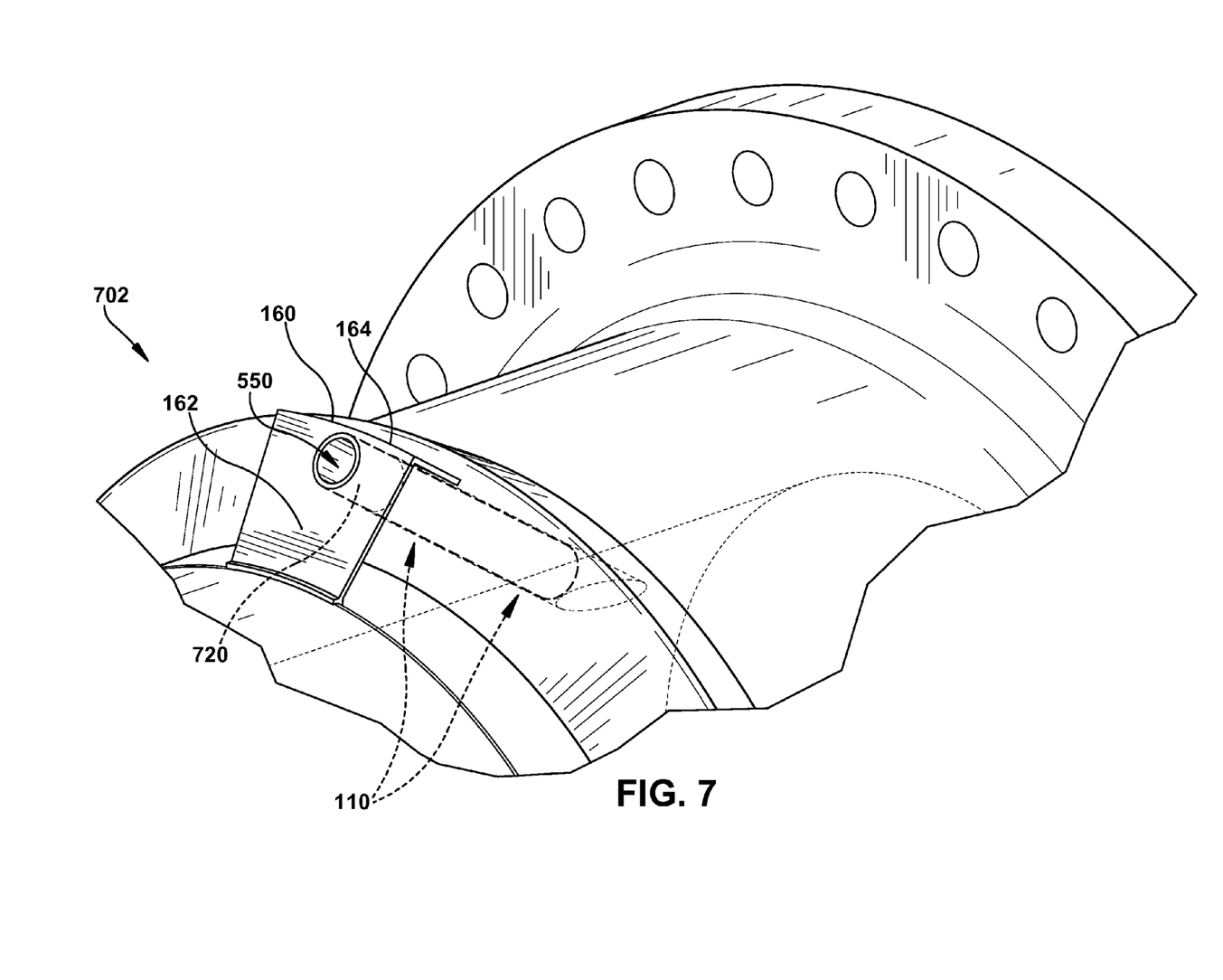
FIG. 7 shows a three-dimensional perspective view of a portion of a turbine according to an embodiment of the invention.

Turning to FIG. 7, a three-dimensional perspective view of a turbine wheel 702 is shown according to embodiments. In this embodiment, a cover 160 is connected to a sleeve 720. Cover 160 includes an axial flange 164 and a radial flange 162 which contact turbine wheel 702 and thereby locate and secure sleeve 720 to turbine wheel 702 and component conduit 110. It is understood that cover 160 and sleeve 720 may be separable and/or may be formed as a uniform component.

Figure 8:
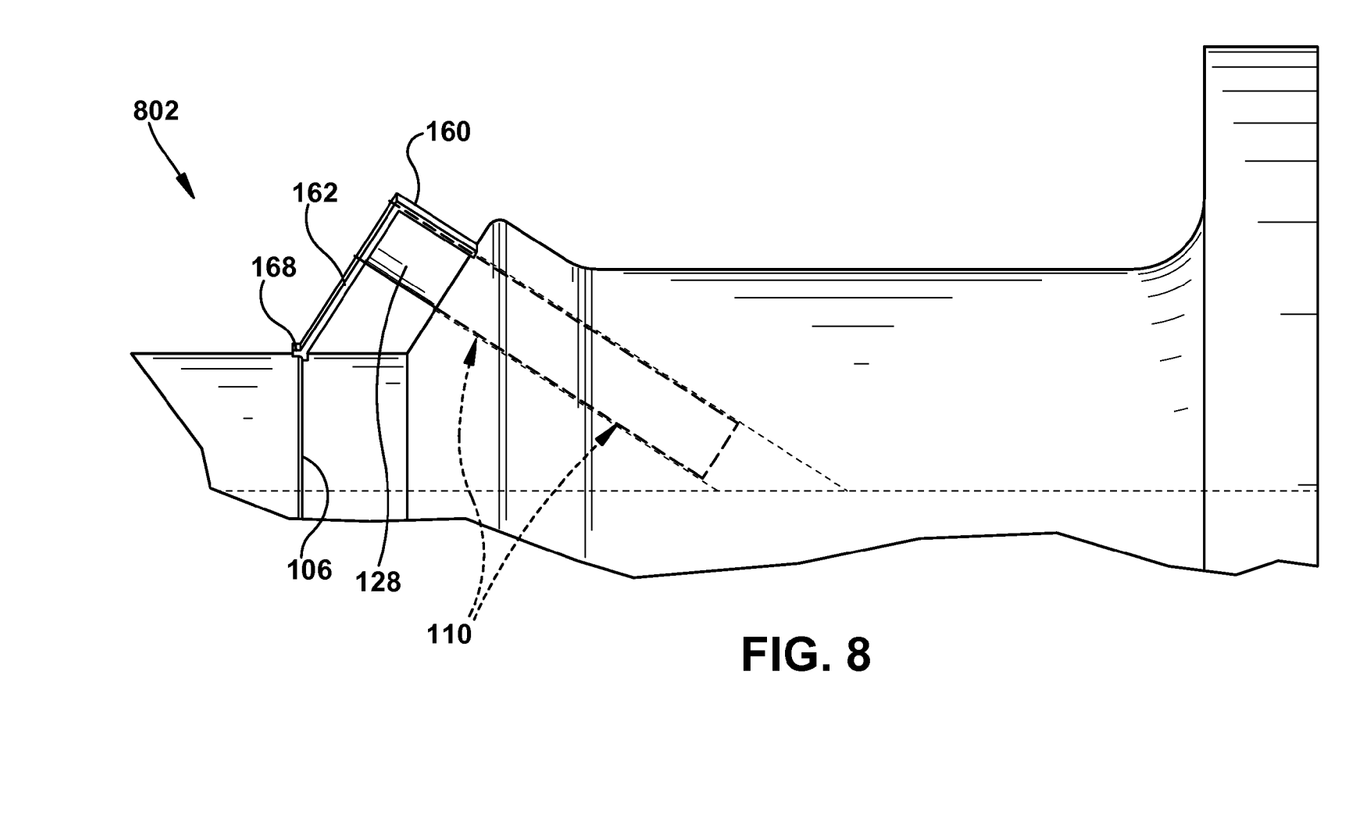
FIG. 8 shows a three-dimensional perspective view of a portion of a turbine according to an embodiment of the invention.
Figure 9:
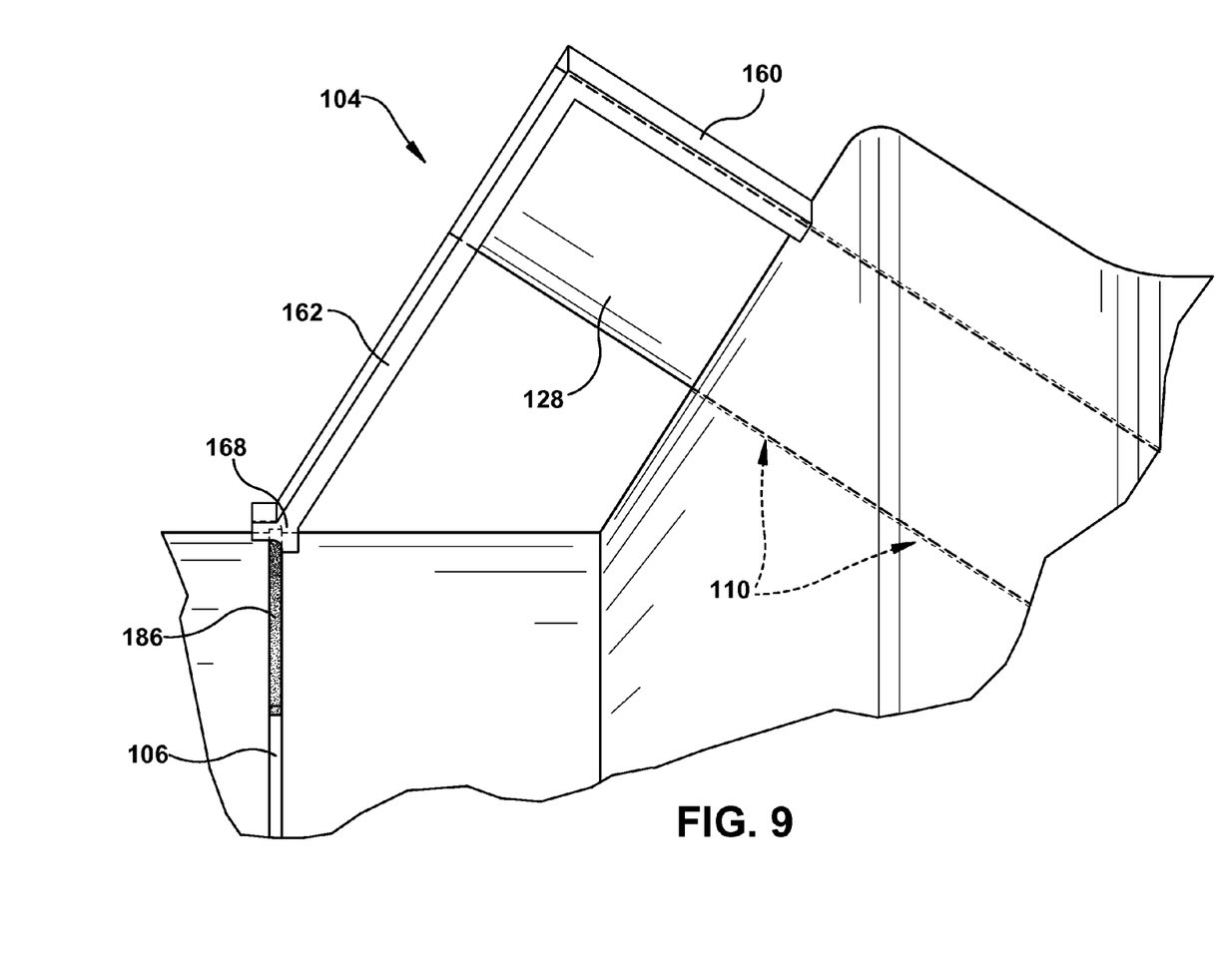
FIG. 9 shows a three-dimensional perspective view of a portion of a turbine according to an embodiment of the invention.

Turning to FIG. 8, a three-dimensional perspective view of a portion of a turbine component 802 including a cover groove 106 is shown according to embodiments of the invention. In this embodiment, a radial flange 162 of a cover 160 may include a hook 168 connected to cover groove 106. Hook 168 may insert into a portion of cover groove 106 thereby axially restraining sleeve 128 and locating sleeve 128 relative component conduit 110. As can be seen in FIG. 9, a lock wire 186 may be disposed in cover groove 106 adjacent hook 168 to further secure cover 160 and/or sleeve 128 relative turbine component 802 and component conduit 110.

Figure 10:
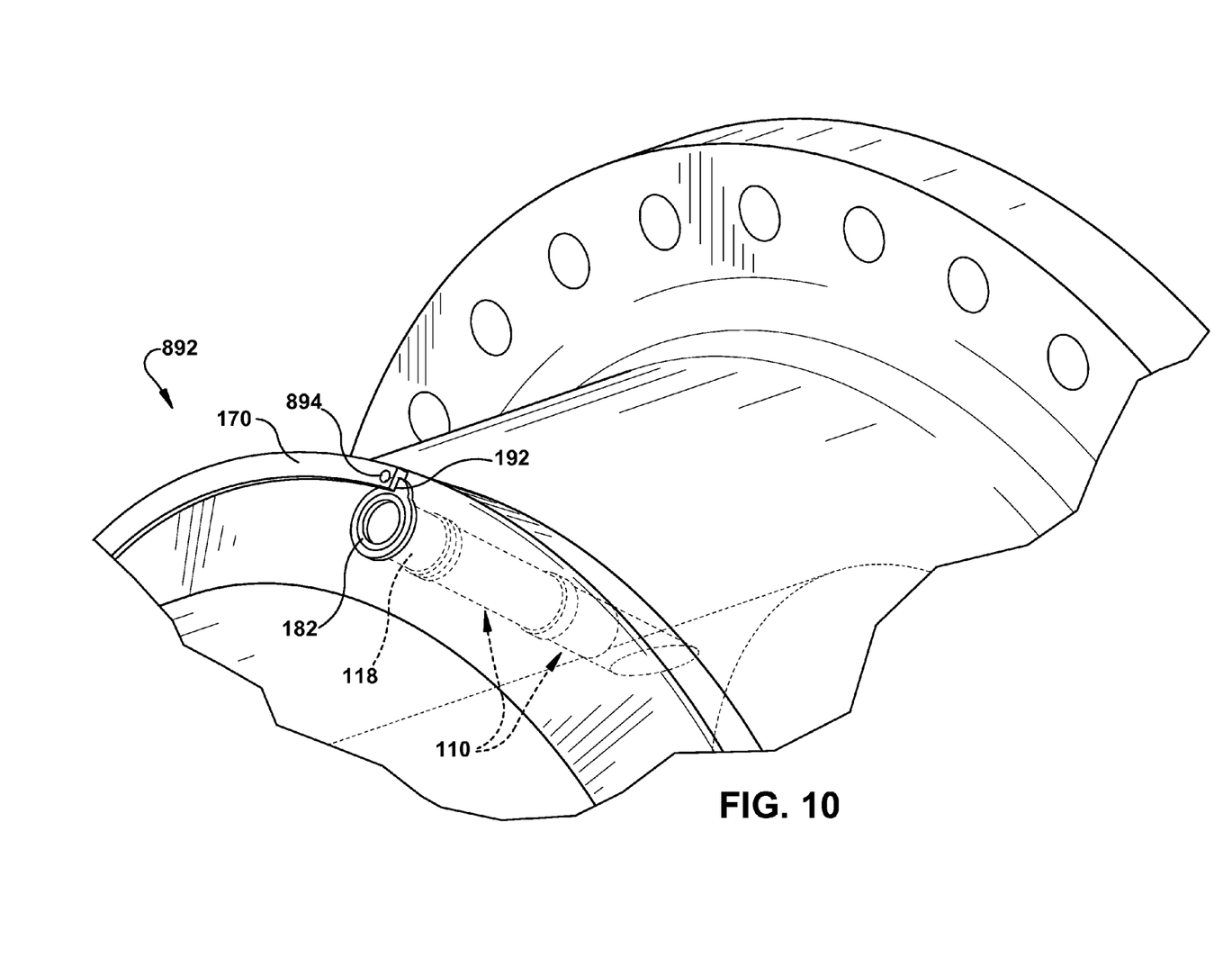
FIG. 10 shows a three-dimensional perspective view of a portion of a turbine according to an embodiment of the invention.

Turning to FIG. 10, a three-dimensional perspective view of a portion of a turbine component 892 is shown with a sleeve 118 (shown in phantom) retained within component conduit 110 (shown in phantom) via a cap seal 170 according to embodiments of the invention. In this embodiment, cap seal 170 extends circumferentially about a portion of turbine component 892 and contacts a tab 192 connected to sleeve 118. Cap seal 170 retains sleeve 118 in component conduit 110, restricting axial movement. In one embodiment, cap seal 170 may be installed upon turbine component 892 and rotated over a portion of sleeve 118, thereby securing a position of sleeve 118. Cap seal 170 may connect to turbine component 892 and/or sleeve 118 via a bolt (e.g., screw, pin, etc.) 894 disposed within cap seal 170.

Figure 11:
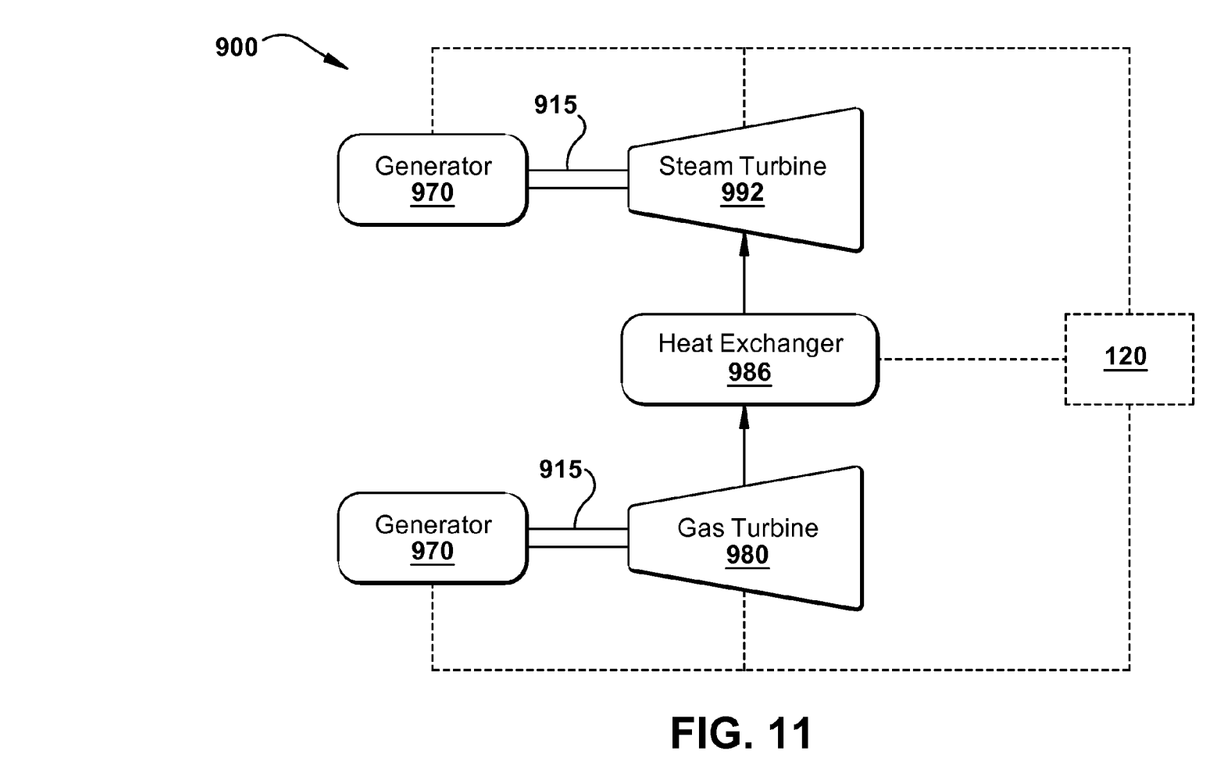
FIG. 11 shows a schematic block diagram illustrating portions of a combined cycle power plant system according to embodiments of the invention.
Figure 12:
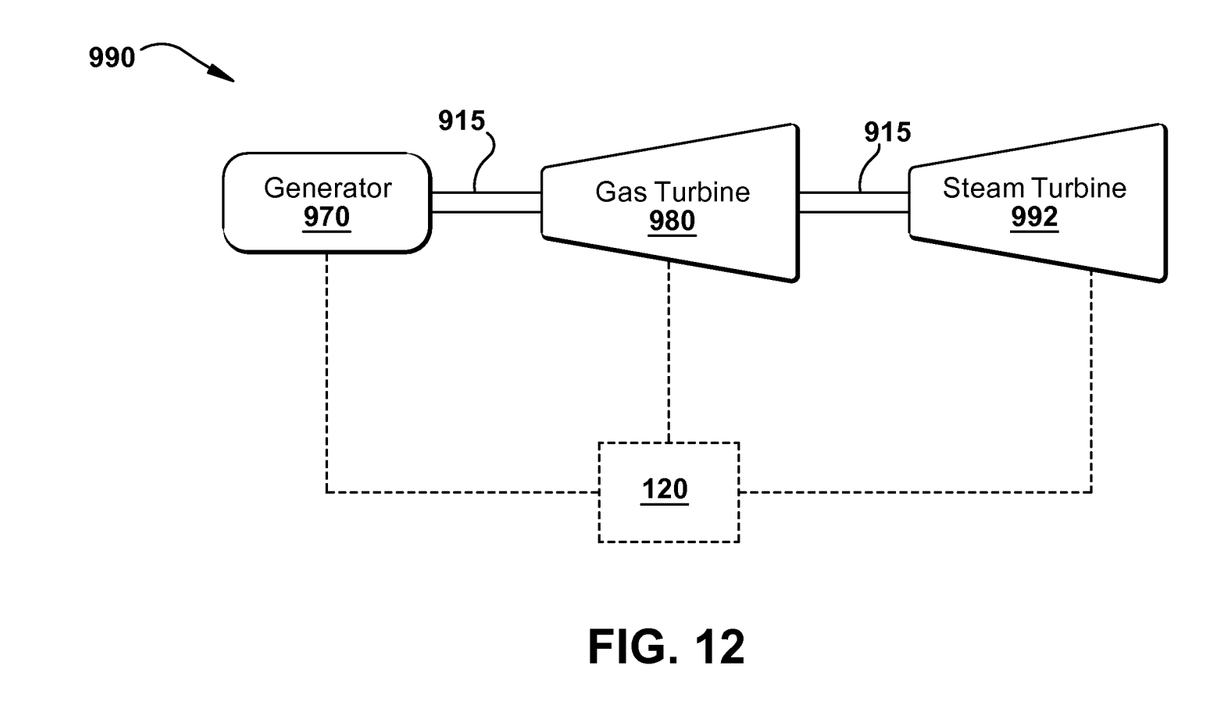
FIG. 12 shows a schematic block diagram illustrating portions of a single-shaft combined cycle power plant system according to embodiments of the invention.

Turning to FIG. 11, a schematic view of portions of a multi-shaft combined cycle power plant 900 is shown. Combined cycle power plant 900 may include, for example, a gas turbine 980 operably connected to a generator 970. Generator 970 and gas turbine 980 may be mechanically coupled by a shaft 915, which may transfer energy between a drive shaft (not shown) of gas turbine 980 and generator 970. Also shown in FIG. 11 is a heat exchanger 986 operably connected to gas turbine 980 and a steam turbine 992. Heat exchanger 986 may be fluidly connected to both gas turbine 980 and a steam turbine 992 via conventional conduits (numbering omitted). Gas turbine 980 and/or steam turbine 992 may include sleeve 120 of FIG. 2 or other embodiments described herein. Heat exchanger 986 may be a conventional heat recovery steam generator (HRSG), such as those used in conventional combined cycle power systems. As is known in the art of power generation, HRSG 904 may use hot exhaust from gas turbine 980, combined with a water supply, to create steam which is fed to steam turbine 992. Steam turbine 992 may optionally be coupled to a second generator system 908 (via a second shaft 915). It is understood that generators 908 and shafts 907 may be of any size or type known in the art and may differ depending upon their application or the system to which they are connected. Common numbering of the generators and shafts is for clarity and does not necessarily suggest these generators or shafts are identical. In another embodiment, shown in FIG. 12, a single shaft combined cycle power plant 990 may include a single generator 970 coupled to both gas turbine 980 and steam turbine 992 via a single shaft 915. Steam turbine 992 and/or gas turbine 980 may include sleeve 120 of FIG. 2 or other embodiments described herein.

The sleeves and covers of the present disclosure are not limited to any one particular turbine, power generation system or other system, and may be used with other power generation systems and/or systems (e.g., combined cycle, simple cycle, nuclear reactor, aviation engines etc.). Additionally, the sleeves and covers of the present invention may be used with other systems not described herein that may benefit from the shielding described herein. It is understood that the embodiments disclosed herein are merely illustrative, and that any combination of the features described herein may be considered as an embodiment.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A sleeve disposed within a portion of a turbine conduit, the sleeve for adjusting a flow of working fluid passing through the turbine conduit and comprising:
   a base portion defining a shield aperture, the base portion including an external surface configured to contact an internal surface of a turbine conduit; and
   a neck portion connected to the base portion and defining a neck aperture proximate a terminus of the turbine conduit, the neck aperture fluidly connected to the shield aperture,
   wherein the neck portion is configured to extend into a working fluid flow passage of a turbine thereby adjusting the flow of working fluid passing through the turbine conduit from a laminar flow to a turbulent flow.

2. The sleeve of claim 1, wherein the neck portion extends into the working fluid flow passage of the turbine at an initial entrance flow region of the turbine conduit.

3. The sleeve of claim 1, wherein the base portion includes a set of stand-offs disposed on the external surface and the sleeve further comprises a fluidly isolated cavity disposed between the set of stand-offs.

4. The sleeve of claim 1, further comprising a cover connected to the neck portion and configured to connect to a turbine component.

5. The sleeve of claim 1, wherein the neck portion includes a flange configured to complement a slot on a turbine component.

6. The sleeve of claim 3, wherein the set of stand-offs include a ring disposed about a circumference of the base portion.

7. The sleeve of claim 1, wherein the base portion includes a stand-off ring disposed about a circumference of the sleeve on the external surface.

8. A turbine, comprising:
   a stator;
   a working fluid passage substantially surrounded by the stator;
   a rotor configured radially inboard of the working fluid passage;
   a turbine component connected to the rotor, the turbine component including a turbine conduit; and
   a sleeve disposed within a portion of the turbine conduit, the sleeve for adjusting a flow of working fluid passing through the turbine conduit and including:

a base portion defining a shield aperture, the base portion including an external surface configured to contact an internal surface of the turbine conduit; and a neck portion connected to the base portion and defining a neck aperture proximate a terminus of the turbine conduit, the neck aperture fluidly connected to the shield aperture, wherein the neck portion extends into a working flow passage of the turbine thereby adjusting the flow of working fluid passing through the turbine conduit from a laminar flow to a turbulent flow.

9. The turbine of claim 8, further comprising a cover connected to the neck portion, the cover including a windage surface extending into the working fluid passage.

10. The turbine of claim 8, wherein the neck portion includes a flange configured to complement a hook connected to the turbine component, the flange positioning the sleeve within the turbine conduit.

11. The turbine of claim 8, wherein the neck portion extends into the working fluid flow passage of the turbine at an initial entrance flow region of the turbine conduit.

12. The turbine of claim 8, wherein the neck portion includes a flange configured to complement a slot on the turbine component.

13. The turbine of claim 8, wherein the base portion includes a set of stand-offs disposed on the external surface and the sleeve further comprises a fluidly isolated cavity disposed between the set of stand-offs.

14. The turbine of claim 13, wherein the set of stand-offs include a ring disposed about a circumference of the base portion.

15. A system comprising:
a turbine component configured to connect to a rotor, the turbine component including a turbine conduit; and
a sleeve disposed within a portion of the turbine conduit, the sleeve for adjusting a flow of working fluid passing through the turbine conduit and including:
a base portion defining a shield aperture, the base portion including an external surface configured to contact an internal surface of the turbine conduit; and
a neck portion connected to the base portion and defining a neck aperture proximate a terminus of the turbine conduit, the neck aperture fluidly connected to the shield aperture,
wherein the neck portion extends into a working flow passage of a turbine thereby adjusting the flow of working fluid passing through the turbine conduit from a laminar flow to a turbulent flow.

16. The system of claim 15, further comprising a cover connected to the neck portion, the cover including a windage surface.

17. The system of claim 15, wherein the neck portion extends into the working fluid flow passage of the turbine at an initial entrance flow region of the turbine conduit.

18. The system of claim 15, wherein the neck portion includes a flange configured to complement a slot on a turbine component.

19. The system of claim 15, wherein the base portion includes a set of stand-offs disposed on the external surface and the sleeve further comprises a fluidly isolated cavity disposed between the set of stand-offs.

20. The system of claim 19, wherein the set of stand-offs include a ring disposed about a circumference of the base portion.

* * * * *